United States Patent [19]

Buettiker et al.

[11] Patent Number: 4,776,734
[45] Date of Patent: Oct. 11, 1988

[54] TOOL HOLDER

[75] Inventors: Otto Buettiker, Haegendorf; Johannes Christoffel, CH-Gipf-Oberfrick, both of Switzerland

[73] Assignee: Dihart AG, Dulliken, Switzerland

[21] Appl. No.: 17,760

[22] Filed: Feb. 24, 1987

[30] Foreign Application Priority Data

Mar. 3, 1986 [EP] European Pat. Off. ........ 86102745.6

[51] Int. Cl.⁴ .......................................... B23B 29/034
[52] U.S. Cl. ...................... 409/234; 408/59; 408/150; 408/181; 279/6; 33/559
[58] Field of Search ............... 409/234; 408/146, 150, 408/173, 181, 57, 59, 186; 279/6, 20; 33/559, 561, 558, 572

[56] References Cited

U.S. PATENT DOCUMENTS

| | | | |
|---|---|---|---|
| 2,093,743 | 9/1937 | Steiner | 279/6 |
| 2,435,396 | 2/1948 | Koch | 279/6 |
| 2,733,073 | 1/1956 | Phillips | 279/6 |
| 3,153,356 | 10/1964 | Dearborn | 408/59 |
| 3,685,917 | 8/1972 | Patt | 408/150 |
| 3,858,482 | 1/1975 | Scaduto | 279/6 |
| 4,611,814 | 9/1986 | Hiestand | 279/20 |

FOREIGN PATENT DOCUMENTS

| | | | |
|---|---|---|---|
| 918475 | 2/1947 | France | 408/181 |
| 354646 | 7/1961 | Switzerland | 408/173 |

OTHER PUBLICATIONS

"Elektrojet Universal Collet Chuck", The Cincinnati Milling Machine Company, publication No. M-218.

Primary Examiner—Gil Weidenfeld
Assistant Examiner—Daniel W. Howell
Attorney, Agent, or Firm—Ladas & Parry

[57] ABSTRACT

For correcting axial errors of a tool, the latter is held by a two-part tool holder, whose two parts are reciprocally displaceable by a setscrew along their engaging interfaces at right angles to the axis. For this purpose, the locking screws of a flange connection are correspondingly loosened. The axial correction can be simply and rapidly performed, in that the setscrew is provided on a setting ring rotatable about the axis.

16 Claims, 1 Drawing Sheet

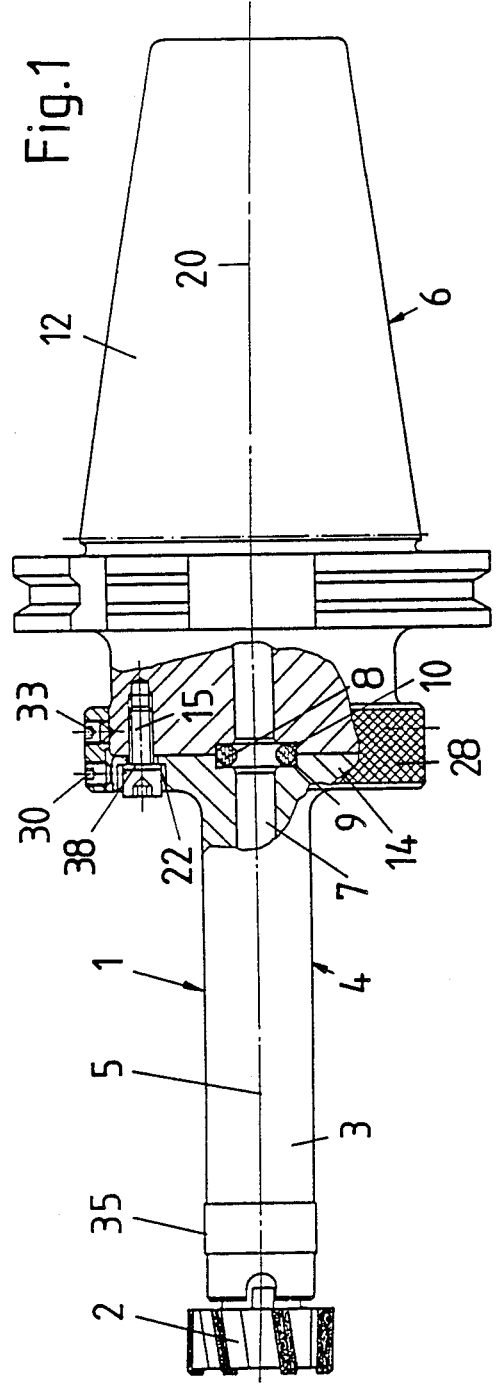
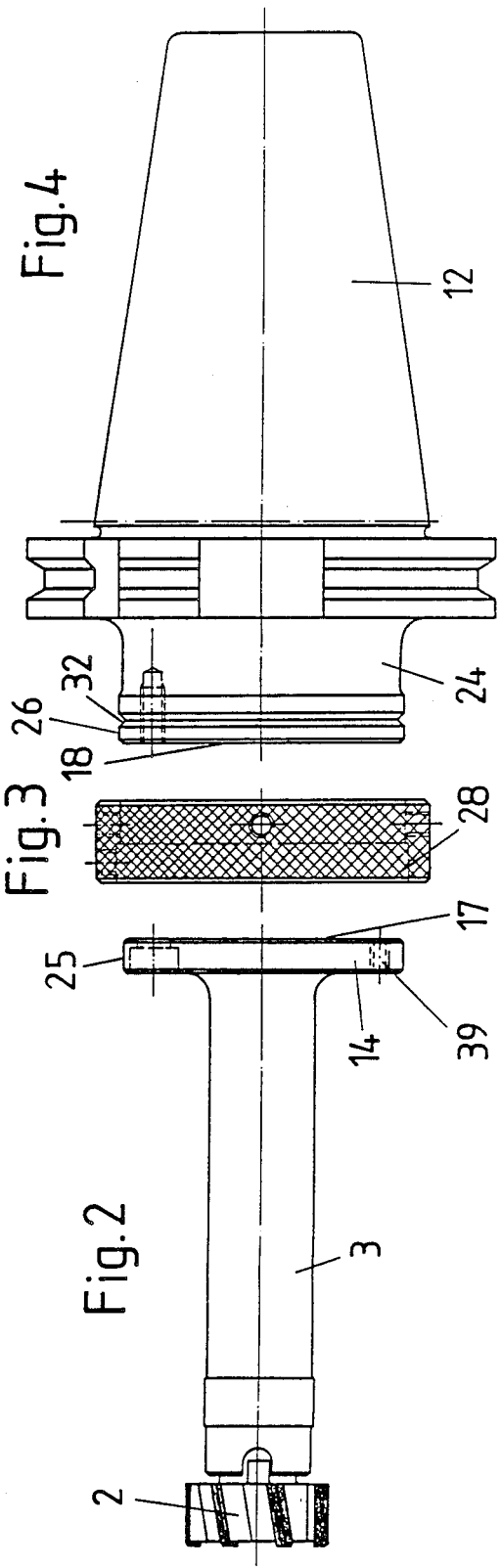

TOOL HOLDER

BACKGROUND OF THE INVENTION

The present invention relates to a tool holder for compensating axial errors, with two holder parts adjustable relative to one another, whereof one is provided at its free end with a tool mounting and the other is constructed for connection in the tool mounting of a machine tool.

The precise alignment of the axis of a tool is known to be necessary in order to ensure a precise working of a workpiece, e.g. by drilling, countersinking, milling, reaming, etc. In the case of an axial displacement or axis angle errors, the tool performs a movement on a circular path, which leads to a corresponding erroneous geometry of the shape of the surface to machine. Floating holders are known for compensating tumbling or wobbling movements of the rotating tool. However, they do not eliminate the influence of gravitational forces acting on the tool. It is also generally known to perform axial alignments or orientations by three setscrews arranged on the circumference of the part to be aligned and fixed with respect thereto. However, such aligning is time-consuming and imprecise, as specific setting directions must be obtained through the combined adjustment of the setscrews.

SUMMARY OF THE INVENTION

The problem of the present invention is to find a tool holder of the aforementioned type which, in the case of a simple construction, permits a rapid, precise alignment of the axis of a tool and which can be easily used. According to the invention this problem is solved in that both holder parts are provided on a front face facing the other holder parts with a planar interface at right angles to the longitudinal axis thereof, the interfaces of the two holder parts being non-positively engaged on one another by adjustable, axially acting clamping means and a setting device acting at right angles to the longitudinal axis between the two holder parts is provided for the transverse displacement of the holder part along the interface of the other holder part on a setting ring which can be rotated about the axis.

BRIEF DESCRIPTION OF THE DRAWINGS

The invention is described in greater detail hereinafter relative to non-limitative embodiments and the attached drawings, wherein show:

FIG. 1 a part sectional view of a tool holder according to the invention,

FIG. 2 the tool-side holder part of the tool holder according to FIG. 1,

FIG. 3 the setting ring of the tool holder according to FIG. 1 and

FIG. 4 the machine tool-side holder part of the tool holder according to FIG. 1.

DETAILED DESCRIPTION OF THE PREFERRED EMBODIMENTS

The represented tool holder 1 carries as the tool 2 a reamer head, which is fixed in the mounting shank or shaft 3 of holder part 4. Thus, its axis is fixed relative to the axis 5 of holder part 4. A central cooling duct 7 extends through both holder parts 4 for lubricating and cooling tool 2. An o-ring 8 is inserted in each duct shoulder 9, 10 for sealing between the two holder parts 4,6 at the transition point of cooling duct 7.

The other holder part 6 to be inserted in the tool mounting of a machine tool has a conical holder shaft 12 with standard dimensions (e.g. DIN 69871A).

The connection between the two holder parts 4, 6 takes place in much the same way as for a pipe flange connection, in that a flange 14 shaped onto the mounting shaft 3 is non-positively fixed by at least three axially parallel screws 15 to the holder part 6 or a counterflange shaped thereon. Thus, the interfaces 17, 18, which are non-positively interconnected, run at right angles to the axes 5, 20 of holder parts 4, 6 and have a finished surface, so that they can be reciprocally displaced in the desired alignment position with high accuracy in the setting or adjusting range of the tool holder 1 according to the invention, if the frictional force between them can be reduced to an adequate amount by loosening the locking screws 15. The flange bores 22 provided for the passage of locking screws 15 in flange 14 of holder part 4 have a diameter which is sufficiently large compared with that of the locking screws, so that this displacement movement can be carried out to effect alignment of axes 5, 20. As the necessary axial corrections generally only have to compensate relatively small axial errors of tools, the diameter difference used for comparable flange holes can be adequate.

The adjacent regions of both holder parts 4, 6, i.e. flange 14 on mounting shaft 3 and the fixing shoulder 24 engaging thereon, have a circular cylindrical circumferential surface 25, 26, jointly surrounded by a setting ring 28 rotatable about the axis 20 of holder part 6. The diameter of flange 14 is somewhat smaller than that of fixing shoulder 24 or sufficiently smaller compared with the internal diameter of setting ring 28, so that holder part 4 with its flange 14 can be moved backwards and forwards by a radially directed setscrew 30 of setting ring 28 within the latter, so as to permit axial alignment to take place. According to the invention, only one setscrew 30 on setting ring 28 is used and can be turned into the desired setting direction by turning the setting ring 28 on fixing shoulder 24. For this purpose, the setting ring 28 is rotatably guided on the circular cylindrical fixing shoulder 24 and for this purpose a guide groove 32 is provided in the latter, in which engage guide screws 33 uniformly distributed around the circumference of setting ring 28 and which in the same way as setscrew 30 can be constructed as threaded pins with an internal hexagon or socket head. The sharp end thereof engages in the V-shaped guide groove. To permit easy manual adjustment of setting ring 28, the latter is circumferentially knurled and this is shown in the drawing by cross-hatching.

For the precise alignment of the rotation axis 5 of the holder part 4 carrying tool 2, it is e.g. possible to place the tracer of a micrometer dial gauge on a ground collar surface 35 of mounting shaft 3. Setscrew 33 is set to the same angular position on holder part 4 through the turning of setting ring 28 as the angular position in which the measuring instrument established the largest magnitude, i.e. the greatest axial deviation. By turning the setscrew, holder part 4 is then moved in the direction in which the axial correction is to take place. The alignment of holder part 4 and therefore tool 2 is then again controlled by means of the measuring instrument and, if necessary, a new setting takes place in the same way by means of the setscrew. Locking screws 15 are only tightened to such an extent that a play-free displacement of the interfaces 17, 18 of the two holder parts 4, 6 on one another with self-adhesion is made possible. The necessary setting position of the locking screws 15 requires a much smaller accuracy or handling is greatly facilitated if use is made of springy or resilient mounting or clamping members or if the locking screws 15 are supplemented by a spring washer 38 or a cup spring 38, via which the head of the locking screw 15 acts on flange 14. Thus, in such a construction during the performance of the axial correction, the interfaces 17, 18 consequently engage with spring preloading on one another under the pressure of said spring members 38 and can consequently be displaced easily and in a controlled manner by setscrew 30, without any uncontrolled displacement being possible under the influence of the shear force. Upon fully adjusting the tool so that axes (20) and (5) are in alignment, the locking screws are fully tightened again, so that the flange connection between the two holder parts 4, 6 can absorb the working forces of tool 2 without any axial adjustment.

Tool holder 1 can additionally be constructed in such a way that an angular correction of axis 5 is also possible. Therefore, flange 14 can have axially directed tapholes 39, so that forcing screws screwed into the latter press against interface 18 of the other holder part 6 and therefore bring about an angular adjustment between axes 5 and 20.

What is claimed is:

1. A tool holder for compensation of axial alignment errors, with two holder parts adjustable relative to one another, whereof one is provided with a tool mounting and the other is constructed for connection in the tool mounting of a machine tool, wherein both holder parts have a planar interface on a front face facing the other holder part which planar interfaces are at right angles to the longitudinal axis thereof, said interfaces of the two holder parts being held against one another by adjustable, axially acting clamping means and a setting device (30) is provided acting at right angles to the longitudinal axis between the two holder parts for the transverse adjusting displacement of one holder part along the interface of the other holder part, which setting device (30) is carried by setting ring (28) which is rotatably guided on one of said holder parts (4, 6) around the longitudinal axis (20) thereof.

2. A tool holder according to claim 1, wherein between the two holder parts is provided a flange connection with a flange on at least one of the holder parts, at least one of the holder parts being provided in the vicinity of the flange connection with a circular cylindrical circumferential surface, on which the setting ring is rotatably guided.

3. A tool holder according to claim 2, wherein a guide groove for the engagement of a guide member fixed to the setting ring is provided in the circumferential surface guiding said setting ring.

4. A tool holder according to claim 3, wherein the circumferential surface of the setting ring has a profiling.

5. A tool holder according to claim 1, wherein axially directed tapholes are provided in at least one of the holder parts and extend up to the interface of the other holder part and serve to receive a forcing screw for compensating angular errors of the tool axis.

6. A tool holder according to claim 1, wherein the clamping means rigidly hold together said two holder parts and are combined with a spring member, the clamping means being cap screws and the spring member being a spring washer or cup spring.

7. A tool holder for alignment of two axes, said tool holder comprising:

a first part having a longitudinal axis and a planar face that is generally perpendicular to said longitudinal axis of said first part;

a second part having a longitudinal axis and a planar end generally perpendicular to said longitudinal axis of said second part, said planar end being placed generally opposite said planar face of said first part;

axially adjustable clamping means for holding said planar end and said planar face against one another and facilitating the radial adjustment of said parts to align said parts' respective axis with each other; and setting means comprised of a setting ring rotatably guided on one of said parts around that part's longitudinal axis and a single setting device carried by said setting ring, said setting device acting generally perpendicularly of said axis to adjustably displace one of said parts with respect to the other of said parts, said displacement being accomplished by the rotation of said setting means.

8. The tool holder of claim 7 further comprising a flange connected to one of said parts;

a flange connection associated with said flange and located between said parts, at least one of said parts having a circumferential surface near said flange connection on which said setting ring is rotatably guided.

9. The tool holder claimed in claim 8 wherein both of said parts are provided with circumferential surfaces in the vicinity of said flange connection said setting device engaging at least one of the circumferential surfaces of at least one of said holder parts, said circumferential surface of one of said holder parts having a smaller diameter than said other circumferential surface such that one part is displaceable within said setting ring by means of said setting device.

10. The tool holder claimed in claim 8 further comprising at least one guide member fixed to said setting ring, and wherein said circumferential surface defines a guide groove for receiving said guide member to guide said setting ring.

11. The tool holder claimed in claim 10 wherein the setting device and the guide member are threaded pins and wherein said setting ring defines in its surface radial tap holes for receiving said threaded pins.

12. The tool holder claimed in claim 11 wherein the circumferential surface of said setting ring has profiling.

13. The tool holder claimed in claim 7 further comprising an axial cooling duct extending through said parts; and an O-ring associated with said duct, the area of interface between said planar end and said planar face being sealed wtih respect to said cooling duct by said O-ring.

14. The tool holder claimed in claim 7 further comprising a forcing screw; and at least one of said parts defining in its surface axially directed tap holes extending to the area of interface between said planar face and said planar end and receiving said forcing screw, said forcing screw being used to adjust said tool to compensate for angular errors of the tool axis.

15. The tool holder claimed in claim 7 further comprising a spring washer associated with said clamping means and wherein said clamping means are cap screws which press against said spring washer.

16. The tool holder claimed in claim 1 further comprising a cup spring associated with said clamping means and wherein said clamping means are cap screws which press against said cup spring.

* * * * *